United States Patent [19]

Böckman

[11] Patent Number: 4,525,181
[45] Date of Patent: Jun. 25, 1985

[54] PROCESS FOR THE REMOVAL OF IMPURITIES IN REACTED ALUMINA

[75] Inventor: Ole K. Böckman, Oslo, Norway
[73] Assignee: Flakt AB, Sweden
[21] Appl. No.: 669,045
[22] Filed: Nov. 6, 1984

Related U.S. Application Data

[63] Continuation of Ser. No. 339,875, Jan. 18, 1982, abandoned.

[30] Foreign Application Priority Data

Feb. 5, 1981 [NO] Norway .................................. 810393

[51] Int. Cl.³ .............................................. B01D 19/00
[52] U.S. Cl. .................................... 55/71; 423/240; 55/465
[58] Field of Search ............... 55/71, 465; 423/240, 423/489; 209/3, 144

[56] References Cited

U.S. PATENT DOCUMENTS

| | | | |
|---|---|---|---|
| 1,997,125 | 4/1935 | Soyez | 55/315 |
| 2,001,184 | 5/1935 | Cuppy | 55/315 |
| 2,540,348 | 2/1951 | Reed | 209/144 |
| 2,606,659 | 8/1952 | Dulait | 209/144 |
| 2,952,357 | 9/1960 | Berg | 209/138 |
| 3,447,678 | 6/1969 | Henry | 209/144 |
| 3,703,957 | 11/1972 | Swanson | 209/144 |
| 3,926,788 | 12/1975 | Stephens | 55/465 |
| 4,061,476 | 12/1977 | Holter et al. | 55/73 |
| 4,065,271 | 12/1977 | Weckesser et al. | 55/71 |
| 4,229,189 | 10/1980 | Pircon | 55/465 |
| 4,306,891 | 12/1981 | Clarke et al. | 55/465 |

FOREIGN PATENT DOCUMENTS 1416344 12/1975 United Kingdom ............ 423/240 S

*Primary Examiner*—Bernard Nozick
*Attorney, Agent, or Firm*—Scully, Scott, Murphy & Presser

[57] ABSTRACT

Process for the separation of fine dust which contains impurities from alumina. The contaminated alumina is firstly subjected to a disintegration step in order to liberate fine dust from the alumina, and then the purified alumina is selectively separated from the fine impurity-containing dust in a separation step.

9 Claims, 2 Drawing Figures

PROCESS FOR THE REMOVAL OF IMPURITIES IN REACTED ALUMINA

This is a continuation of co-pending application Ser. No. 339,875 filed Jan. 18, 1982, now abandoned.

TECHNICAL FIELD

The invention relates to a process for the separation of fine dust which contains impurities from alumina which has been used as adsorbent in a dry purification system without a pre-separating apparatus.

BACKGROUND ART

The industrial production of aluminium metal is exclusively carried out according to the Hall-Héroult-process. In this process alumina, $Al_2O_3$, is electrolytically reduced to metallic Al in a melt of Na-Al-fluorides.

The reduction furnaces emit significant amounts of waste gas. The waste gas contains significant amounts of fluoride in the form of gaseous HF and sublimated fluoride dust from the melt. Further, the waste gas contains some entrapped $Al_2O_3$ from the furnaces and some $SO_2$ (from the anode carbon). From furnaces of the Söderberg type also tarry materials are given off.

Fluoride and $Al_2O_3$ given off with the waste gases represent a corresponding loss in the furnaces and must be replaced by fresh addition of these components. The F evolved represents a loss of furnace bath (electrolyte).

The most common method for purifying the waste gas from the electrolysis furnaces is the so called dry purification process. In this process the ability of $Al_2O_3$ to adsorb HF in the gaseous phase is utilized. There are a number of embodiments of such dry purification systems. Common to them all is that a larger or lesser part of the raw material, $Al_2O_3$, which is to be used in the electrolysis process is added to the waste gas from the furnaces and adsorb the content of HF in the waste gas. Then F-containing (reacted) $Al_2O_3$ is separated from the waste gas in suitable dust separators (most frequently bag filters) which also separate out the contents of other dusts from the waste gas. The separation efficiency of the process is very high, i.e. within the range of from 98% to nearly 100% both with respect to gaseous and dusty fluoride and dust.

In a modern aluminium plant with closed electrolysis furnaces and dry purification system for the waste gases there is an essentially completely closed system which comprises separation and recirculation of all material (except for $SO_2$ and $CO_2$) emitted from the electrolysis process.

However, a such essentially closed recirculation system also suffers from a serious disadvantage. The raw materials which are used in the electrolysis process, more specifically about 1.95 tons of alumina and from 400 to 500 kg of anode carbon per ton of aluminium produced, are not completely pure but contain small amounts of various undesired impurities. A significant proportion of these undesirable impurities is evaporated from the furnace bath with subsequent sublimation and is present in the waste gas in the form of finely divided particles (sublimate). These particles are also separated in the dry purification plant and are recirculated to the electrolysis furnaces as a portion of the reacted alumina (the secondary oxide) which has been used as adsorbent for the waste gas. Small but continuous additions of such impurities may lead to a significant accumulation of impurities in an essentially closed recirculation system. A high level of impurities in the system may contribute to problems both with respect to the production process per se and to the quality of the metal produced.

This problem is in many aluminium plants considered to be of a such serious nature that there has been hesitation to incorporate dry purification systems despite the evident technological and economic advantages possessed by such systems. The undesirable impurities may be divided in two groups based upon their influence on the electrolysis process.

The first group which mainly comprises Fe, Zn, V, Ni and Ga is dissolved in molten aluminium and is a primary contributor to contamination of the metal produced. Especially Fe distinguishes itself negatively in this group. A significant (in part the most significant) portion of the impurities of this type which are present in the electrolysis furnaces is also evaporated from the electrolyte and leaves the furnaces along with the waste gases.

In a closed system the evaporated and sublimated impurities are fed back to the electrolysis furnaces, and the concentration of impurities rises to a level which is conducive to a substantially more contaminated metal than when a corresponding "open" system is used. For an aluminium plant which bases its economy or marketing upon production of highly pure metal a such increase of the concentration of impurities may be unacceptable.

The other group which primarily comprises P, however, also in part C and S, primarily causes the electrolysis process per se to be disturbed and that its efficiency (current efficiency) is reduced. P (phosphorus) in particular exerts a negative influence among the impurities within this group. Phosphorus takes part in the production process in such a manner that the production of metal is reduced for a given consumption of electric current in the furnaces. Practically all phosphorus present is evaporated from the furnace bath in the form of sublimated $P_2O_5$ and is emitted along with the waste gases. Accordingly, phosphorus will be strongly accumulated in a closed system. Limited amounts of phosphorus which are supplied to a closed system, e.g. along with a charge of raw materials of inferior quality, remain in the system for prolonged periods and reduce the current efficiency, i.e. increasing the specific consumption of energy during the electrolysis process. It is obvious that this is a particularly undesirable effect.

Recirculation of Na, which is not an impurity but a component of the furnace bath, may also have undesirable effects. Alumina contains traces of Na from the manufacturing process of the alumina. The accumulation of Na in the system must be compensated by addition of (essentially) $AlF_3$ in order to obtain a balanced composition of the furnace bath. This can lead to an increasing amount of molten salts in the furnaces and must be tapped. Tapped molten bath also involves loss of Al and F and, furthermore, represents a disposal problem.

It has been attempted to overcome in different ways the mentioned disadvantages suffered by the highly efficient dry purification systems.

One method is to use only part of the total demand for alumina in the aluminium plant as adsorbent in the purification plant. Because all electrolysis furnaces will be connected to the purification plant this presupposes that the small amount of oxide possesses sufficient capacity to adsorb the HF emitted from all furnaces. A corresponding number of the electrolysis furnaces is then supplied with reacted oxide (secondary oxide) from the purification plant whilst the remaining furnaces are operated with unreacted oxide (primary oxide). The furnaces with primary oxide can then produce pure virgin metal whereas the concentration of impurities in the furnaces with secondary oxide becomes correspondingly higher. The method may not be driven very far. Recirculation of total F and Na from the purification process with the secondary oxide used as adsorbent leads to an increasing amount of both in these furnaces. If furnace bath must be tapped and transferred to the furnaces which operate with primary oxide also part of the impurities is transferred.

This method increases the requirements to the handling of the oxide and to the process control. The method only represents a half solution to the problem. Few plants with dry purification systems use this method in practice.

A more efficient method is to separate the impurities from the system, directly or indirectly.

The direct method consists in purification of the waste gas from the furnaces for dust in separate dust separators before the waste gas is subjected to purification in the dry purification system. The method is used in aluminum plants with Söderberg furnaces with vertical anodes wherein the amounts of waste gas are small and the Fe content represents the essential contamination problem. In plants having closed furnaces which operate with prebaked anodes the specific amount of waste gas is about 10 times higher (about 100000 Nm$^3$ per ton of metal produced or about 1.8 millions Nm$^3$/h from an aluminium plant with an annual production of 100000 tons). With such amounts of gas an extra pre-separator represents a substantial cost increase for the entire purification system. The pre-separator must be of the highly efficient type because the undesirable impurities essentially occur as sublimate among the very finest fume particles given off from the melt which are the most difficult ones to separate from the waste gas.

Dry purification systems comprising such pre-separators are disclosed in Norwegian Patent Specification No. 131209 and in published Norwegian Patent Application No. 750138. In both cases electrofilters are used as pre-separators.

The methods are claimed to be efficient, however, they suffer from the disadvantage that they become partly very expensive. This pertains in particular to pre-filtering of the large amounts of waste gas from so called pre-baked electrolysis furnaces. For a plant having an annual production of 100000 tons of aluminium the amount of waste gas will be from 1.5 to 2 millions Nm$^3$/h. From 2500 to 3000 m$^3$ of waste gas must be filtered in order to separate 1 kg of dust from the waste gas. This dust may be deposited or further treated in order to recover the high content of F. All particulate F from the furnaces (up to 50% of total F emitted) will be separated from the waste gas during the process.

The present invention relates to an indirect method for the removal of undesirable impurities from the process. The method comprises a process for the removal of undesirable impurities from alumina which has been used as adsorbent in a dry purification system without pre-separator and which, accordingly, contains the undesirable impurities which have been emitted from the furnaces.

The present invention is based on the fact known per se that the impurities in the reacted oxide are present as sublimate (fume), i.e. particles having a diameter from about 0.5 micron (0.5/1000 mm) and smaller, whereas alumina essentially consists of particles (crystals) having a diameter from about 10 microns (1/100 mm) and above (up to about 150 microns).

The literature discloses various attempts to remove undesirable impurities from reacted oxide by separating the finer sublimate from the more coarse oxide.

A method which has been disclosed is to subject a mixture of secondary oxide and water to ultrasonic treatment and then to allow the mixture time to precipitate. Impurities remain dispersed in the aqueous phase together with some oxide. The aqueous phase is decanted, and impurities can be separated from the liquid by filtering (E. R. Cutshall "Light Metal", 2, p. 927, 1979, and U.S. Pat. No. 4,062,696). Flotation is another "wet" treatment method for secondary oxide which has yielded good results. The principle is based on selective wetting. Bubbles of air which are blown into the liquid brings the non-wetted particles up into a froth layer above the liquid and from which they can be removed. Particles which are not wetted sink down.

Of course, these "wet" methods suffer from considerable disadvantages compared with a dry system, and simultaneously also a relatively large proportion of the aluminium oxide is removed along with the impurities (about 10%).

Obviously, dry methods for treatment of secondary oxide would be preferred and some have been attempted.

Mechanical screening and air classification are disclosed in British Patent Specification No. 1,479,924. The secondary oxide is so treated that the fraction of oxide/dust below 20 microns is removed and later subjected to pyrolytic hydrolysis during which the content of fluorine in this fraction is recovered.

The fraction of reacted oxide having a grain size below 20 microns is stated to constitute about 20% of the total amount and it contains about 50% of the impurities. The efficiency of the process is unacceptably low compared with the large amounts of materials which must be further treated, and the method has not gained any practical use.

Another method is classification in cyclones (D. R. Augood "Light Metal", p. 413, 1980), and this method yields somewhat better results than the method discussed immediately above. Nevertheless, the degree of separation of the impurities is not so high compared with the removed amount of oxide as to make the system practically/economically attractive.

Based upon the investigations which have been carried out by the inventor of the present process the rather disadvantageous results which have been obtained by means of the above-mentioned processes are due thereto that the sublimate which it is desired to separate from reacted alumina only to a small extent is present as finely divided separate particles in admixture with the oxide crystals.

The sublimate particles are essentially present as agglomerates. Larger aggregates of agglomerated particles are here partly concerned and partly are the sublimate particles agglomerated more or less firmly to the oxide crystals. These agglomerates will accompany the coarse oxide crystals in a separation process.

If a such separation process is to be efficient, it has according to the invention been found that existing agglomerates of sublimate must firstly be disintegrated to separate particles or to agglomerates of particles having a diameter substantially smaller than the diameter of the fine fraction of alumina crystals. Commercial aluminas generally have a crystal size of from 10 to 150 microns, and the agglomerates of sublimate should preferably be disintegrated to a particle size less than about 1 micron.

SUMMARY OF THE INVENTION

The invention relates to a process for the separation of impurity-containing fine dust from alumina, and the process is characterized therein that the contaminated alumina is firstly subjected to a disintegration step for liberation of fine dust from the aluminia and then to a separation step for selective separation of purified alumina.

DETAILED DESCRIPTION OF THE PREFERRED EMBODIMENTS AND THE DRAWINGS

The disintegration according to the invention of agglomerates of sublimates on contaminated alumina to separate particles can be carried out by means of a dynamic process wherein all particles in the mixture consisting of reacted alumina are brought to collide, slide or roll with large force and at high speed against a surface which is very large compared with the size of the particles.

Several disintegrators of various types have been investigated. A mixture of air (gas) and reacted alumina has been blown at high speed against inclined (for obtaining sliding or rolling) and against transversally arranged (for impact) surfaces, and a such mixture has also been sucked through an apparatus in which the particles collide with vanes rotating at high speed.

A high degree of disintegration can be obtained according to all these embodiments provided the speed is sufficient.

The various embodiments of the disintegrator have different characteristics with regard to energy consumption, abrasion (alumina is a strongly abrading material) and crushing of oxide crystals.

The best results have been obtained using the preferred embodiment of the invention which is a pneumatic system with impact of a mixture of air (gas) and reacted oxide at high speed against a transversally arranged plate coated with an elastic material to obtain elastic impact and minimum abrasion. Subsequent to the disintegration oxide and disintegrated sublimate are carried with the air (gas) stream directly to a dynamic dust separator in which particles with a diameter above 5 to 10 microns are separated and removed from the gas stream whereas submicron (<1 μm) sublimate follows the gas stream and is filtered out in a separate bag filter.

Figure 1:
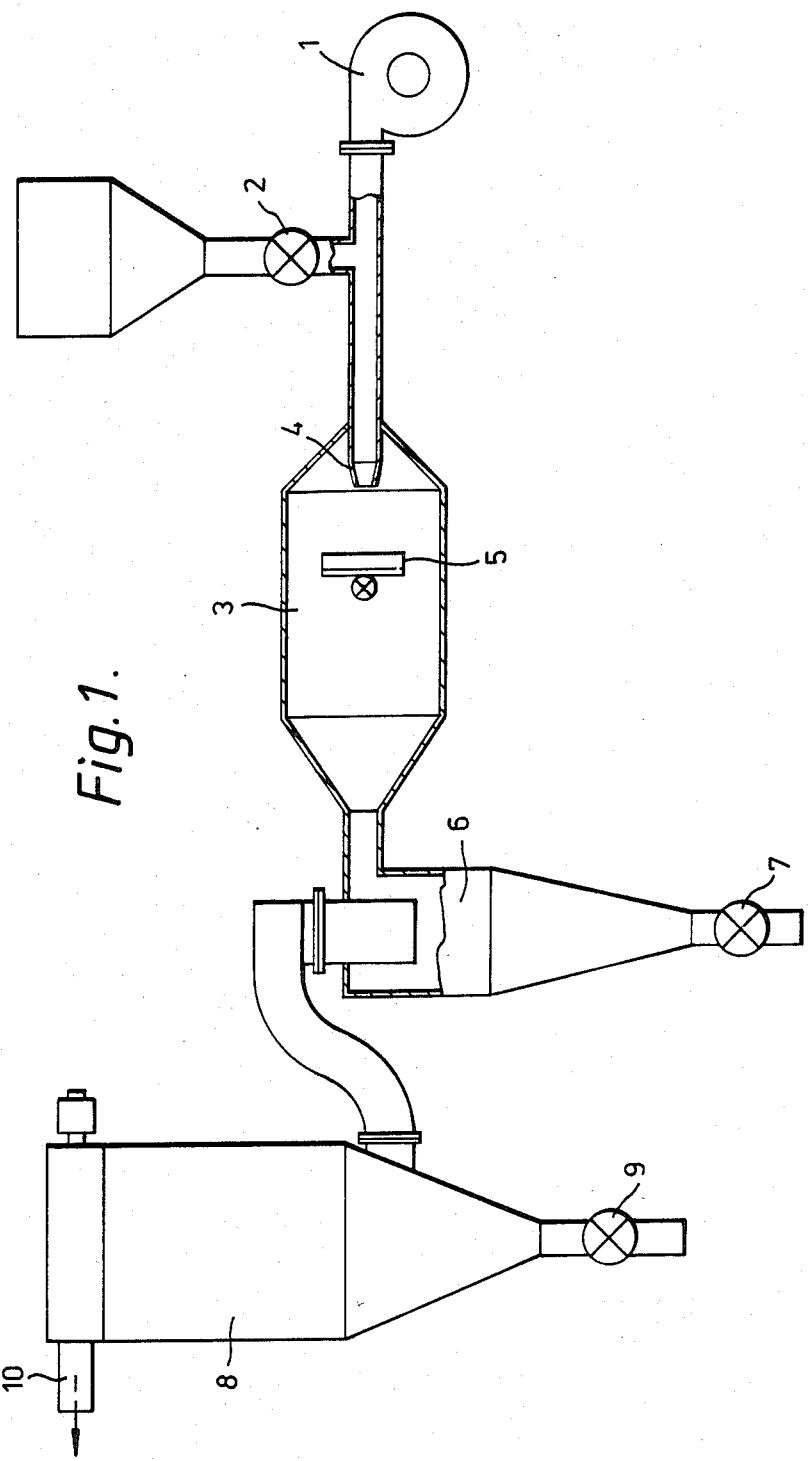
FIG. 1 shows a process apparatus for carrying out a preferred embodiment of the present process and FIG. 2 is a graph depicting the degree of separation of the main impurities from secondary alumina with the percentage removal of the main impurities appearing along the axis of ordinate and with the removed portion (in percent) of the secondary alumina (fine dust) along the axis of abscissa.

According to FIG. 1 the carrying medium (air, gas) is compressed in a centrifugal compressor 1. Reacted oxide is fed into the gas stream by means of a dosage apparatus 2 and is blown into a disintegrator 3 through a nozzle 4. Oxide and gas are here blown at right angle against a plate 5 coated with elastic material. The mixture of gas, purified oxide and disintegrated sublimate is conducted into a mechanical separator 6 in which purified oxide is separated from the gas stream and removed through a discharge means 7. Gas and disintegrated sublimate are conducted to a filter 8 where sublimate is separated and removed through a discharge means 9 whereas purified gas is removed from the system through an outlet 10.

The efficiency of the disintegration and separation process can be defined by means of degrees of effects. Not all sublimate from the furnaces becomes disintegrated from the reacted oxide, and some finely grained oxide will accompany the sublimate which is separated.

Working parameters for the preferred embodiments of the process are:

The ratio of admixture between reacted oxide and medium (air, gas).

Impact speed in the disintegrator.

The grain size distribution of the oxide.

The degree of efficiency of the separator which is defined with regard to the grain size of incoming dust.

An example of effects obtained when treating contaminated secondary oxide in a disintegration/separation apparatus in agreement with the preferred embodiment of the invention appears from the below table. A variable amount of contaminated dust (sublimate) is separated by varying the degree of separation of the mechanical separator as parameter. The separation of the contents of Ni and P from reacted oxide have been stated as representative of each group respectively of impurities (see above). Further, the separation of F has been stated. At the beginning of the table analyses of primary oxide and contaminated oxide with calculated amount of impurities supplied with the furnace gas have been indicated.

The contaminated secondary oxide has the following grain size distribution:

125 microns <7%
90 microns <37% <125 microns
63 microns <28% <90 microns
45 microns <16% <63 microns; 12% <45 microns The following results were obtained (contents of undesirable impurities in % by weight):

|  | Amount % | Ni | P | F |
|---|---|---|---|---|
| Primary alumina | — | 0,0032 | 0,0009 | 0,04 |
| Added through reaction in the purification system | — | 0,0044 | 0,0042 | 0,59 |
| Reacted oxide | 100 | 0,0076 | 0,0051 | 0,63 |
| Purified oxide | 99,3 | 0,0062 | 0,0032 | 0,58 |
| Contaminated dust separated | 0,7 | 0,267 | 0,283 | 7,0 |
| Purified oxide | 99,0 | 0,0057 | 0,0028 | 0,58 |
| Contaminated dust separated | 1,0 | 0,251 | 0,241 | 5,48 |
| Purified oxide | 98,5 | 0,0050 | 0,0024 | 0,56 |
| Contaminated dust separated | 1,5 | 0,201 | 0,197 | 4,55 |
| Purified oxide | 98,1 | 0,0044 | 0,0022 | 0,54 |
| Contaminated dust separated | 1,9 | 0,170 | 0,167 | 4,42 |
| Purified oxide | 96,9 | 0,0032 | 0,0020 | 0,51 |
| Contaminated dust separated | 3,1 | 0,151 | 0,086 | 3,47 |

The material balances are not correct to 100%. Several of the above-mentioned impurities are present in such small concentrations, particularly in injected oxide and cyclone oxide, that the analyses suffer from some margins of errors.

The amount of the fluorine which is removed from the process along with the fine dust is about 10% of the total content of fluorine in the secondary oxide. If desired, this fluorine may be recovered by means of pyrolytic hydrolysis.

Figure 2:
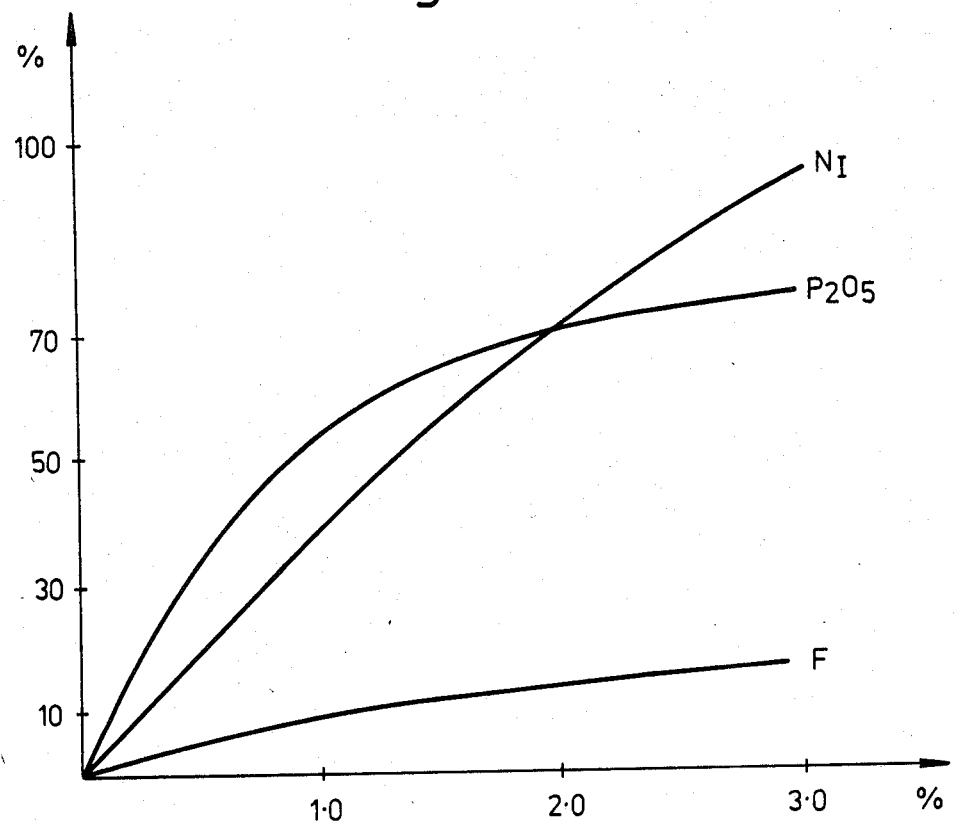

The degrees of separation have been calculated from the above table for the impurities which have been supplied to the secndary oxide from the waste gas. The result is shown in FIG. 2 which gives the separation of Ni, P and F as function of separated amount of contaminated dust in the disintegration/separation system.

The separation effects are far more favourable than for the processes discussed above because they can be obtained by the use of a practical and inexpensive process apparatus and with separation of very small amounts of fine dust from the contaminated oxide.

The degrees of separation do not have to be very high before a such separation process according to the invention will yield a drastic reduction of the level of contamination which otherwise can accumulate in a substantially closed recirculation system.

What is claimed is:

1. In a process for the removal of impurities from alumina crystals which have been used as adsorbent in a dry purification system for purifying waste gases from aluminum electrolysis furnaces for the industrial production of aluminum, wherein said alumina crystals are used essentially to absorb HF which is emitted in the gaseous phase, the impurities being present essentially as agglomerates of sublimate particles in the reacted alumina crystals, the improvement comprising disintegrating the agglomerates of sublimate particles to a dust of finely divided particles of less than about one micron and finely divided agglomerates of particles of less than about one micron with liberation of said particles from the alumina crystals while essentially avoiding any disintegration of the aluminum crystal, the disintegration being carried out by blowing the reacted alumina crystals in a gas/air stream against a substantially transverse impinging surface against which the stream of reacted alumina crystals collide, and selectively separating the alumina crystals from the dust of finely divided sublimate particles and finely divided agglomerates of sublimate particles.

2. A process as claimed in claim 1 wherein the impact means comprises a stationary surface arranged with an inclination toward the direction of the stream of crystals of reacted alumina.

3. A process as claimed in claim 1 wherein the stationary surface is arranged at a right angle to the direction of the stream of crystals of reacted alumina.

4. A process as claimed in claim 1, characterized in that both the disintegration and the separation take place in a pneumatic system with air or gas as carrying medium.

5. A process as claimed in claim 1 or 2, characterized in that there is used an impact surface consisting of an elastic material.

6. A process as claimed in claim 1, characterized in that during the separation, purified alumina is separated while liberated, the fine dust impurities are carried out in the gas/air stream.

7. A process as claimed in claim 6, characterized in that there is used a mechanical separator based on forces of inertia for the separation of purified alumina from the gas/air stream.

8. A process as claimed in claim 6, characterized in that there is used a fall-chamber separator based upon gravitational forces in order to separate purified alumina from the gas/air stream.

9. A process as claimed in claim 6, characterized in that liberated contaminated dust is separated from the gas/air stream in a filter.

* * * * *